March 1, 1966
J. I. ANDERSON
3,237,967
TRANSPORT CONTAINER MANIPULATING APPARATUS FOR VEHICLES
Filed Dec. 13, 1963
3 Sheets-Sheet 1
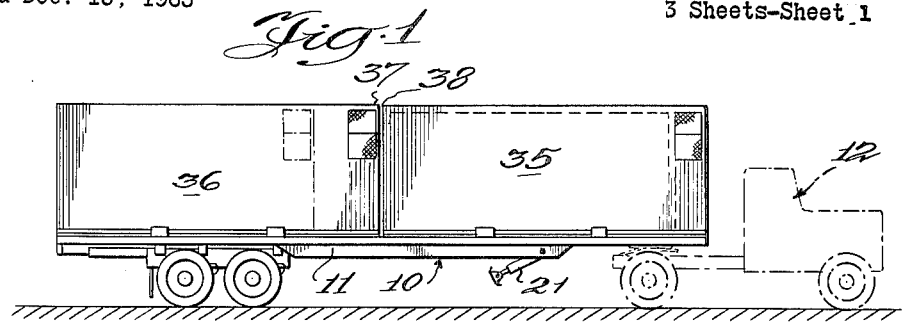
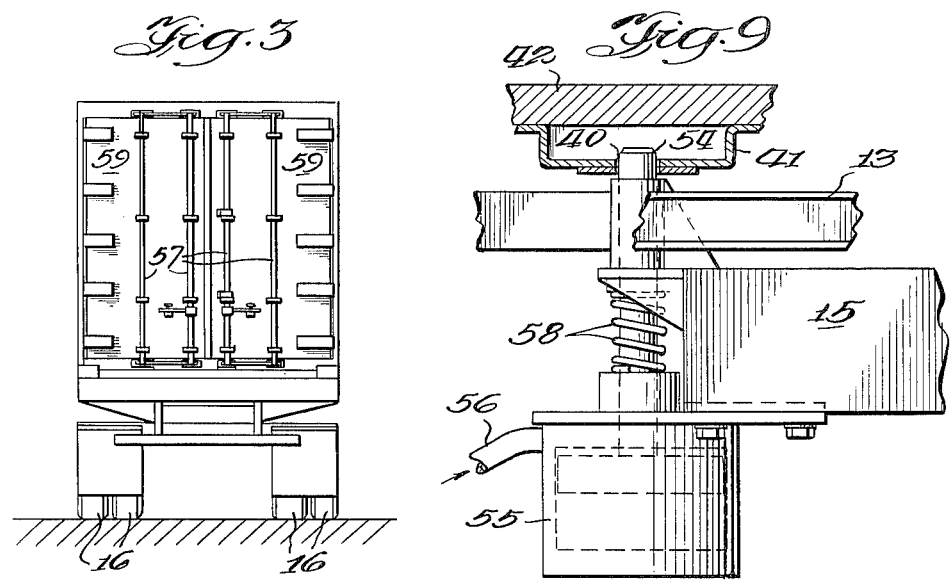
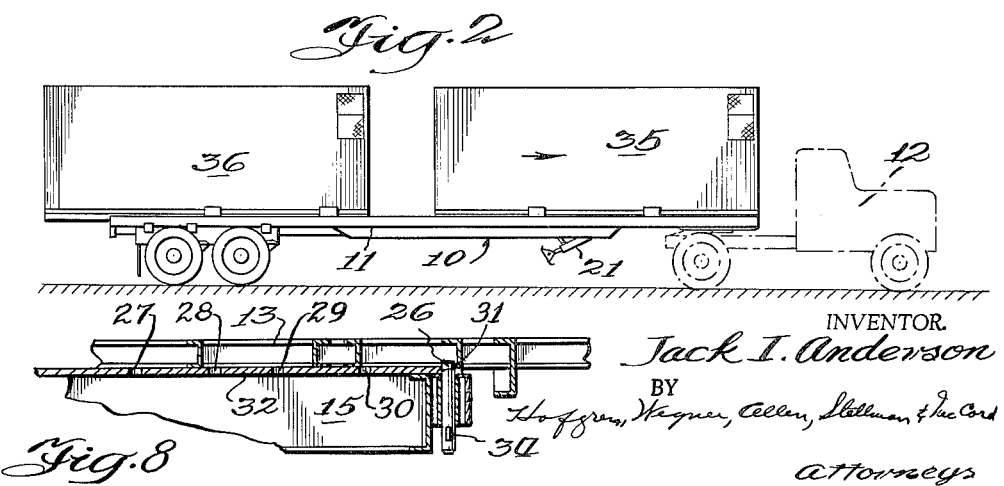
INVENTOR.
Jack I. Anderson
BY
Hofgren, Wegner, Allen, Stellman & McCord
Attorneys March 1, 1966  J. I. ANDERSON  3,237,967
TRANSPORT CONTAINER MANIPULATING APPARATUS FOR VEHICLES
Filed Dec. 13, 1963  3 Sheets-Sheet 2
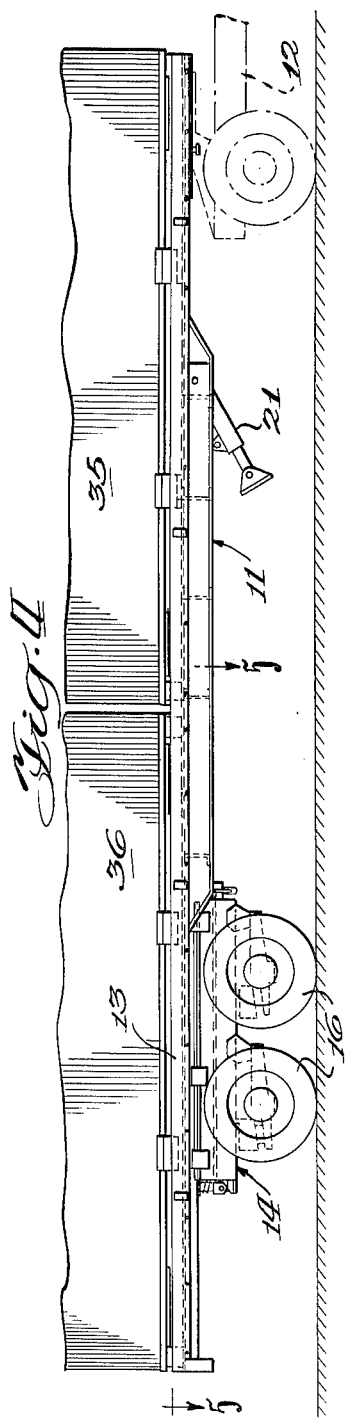
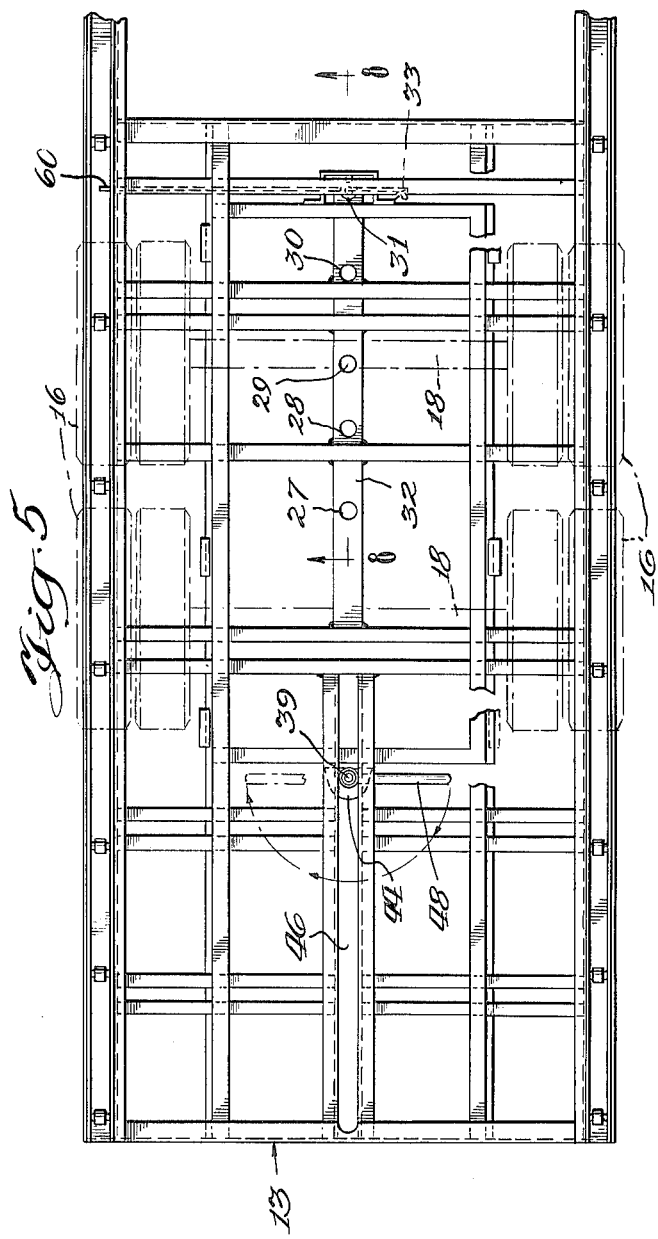

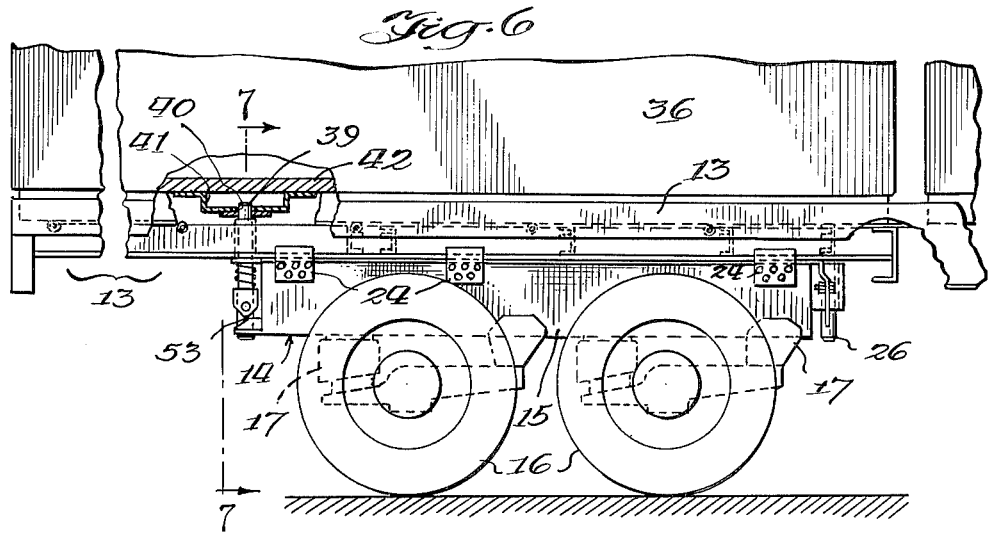
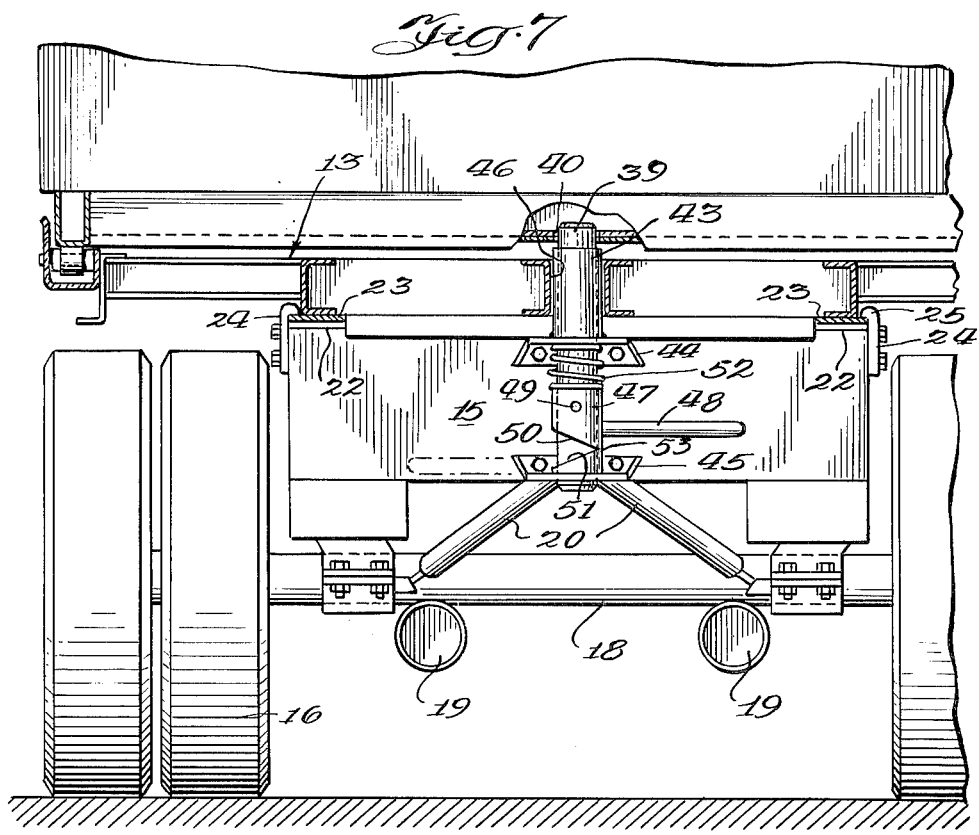

United States Patent Office 3,237,967
Patented Mar. 1, 1966

3,237,967
TRANSPORT CONTAINER MANIPULATING
APPARATUS FOR VEHICLES
Jack I. Anderson, Stevensville, Mich., assignor to Whirlpool Corporation, a corporation of Delaware
Filed Dec. 13, 1963, Ser. No. 330,417
10 Claims. (Cl. 280—423)

This invention relates to a transport apparatus such as a truck having a pair of relatively movable containers thereon with normally adjacent ends with means for moving the containers away from each other when desired to expose their adjacent ends.

In U.S. Patent 3,183,683 there is disclosed and claimed a container that is adapted to contain a preserving atmosphere for storing animal and plant materials in which this atmosphere is generated by an apparatus of the type disclosed and claimed in U.S. Patent 3,102,777. Both patents are assigned to the same assignee as the present application. These controlled atmosphere containers are easily transportable as to the place where the materials are gathered for storage and from this place to a place of disposal such as a market for the materials. The present invention provides a transport apparatus in which two or more of the containers may be transported with the sides such as the end of one is closely adjacent the other but in which the containers may be separated when desired to make these adjacent sides accessible.

One of the features of this invention is to provide an improved transport apparatus having a bed and frame releasably locked together with a first container on the bed and a second container on the frame, with the bed and frame being movable in order to separate the containers, and including means for releasably locking the second container to the frame in order to permit this separation when the frame and bed are moved relative to each other.

Other features and advantages of the invention will be apparent from the following description of certain embodiments thereof taken in conjunction with the accompanying drawings. Of the drawings:

FIGURE 1 is a side elevational view of a trailer adapted to be pulled by a truck, shown in broken lines, and having a pair of containers mounted on the trailer.

FIGURE 2 is a view similar to FIGURE 1 but showing the trailer extended in order to separate the two containers.

FIGURE 3 is a rear view of the trailer of FIGURES 1 and 2.

FIGURE 4 is a fragmentary detail sectional elevational view showing the lower side of the trailer.

FIGURE 5 is a fragmentary plan view of the trailer, omitting the containers and viewed substantially along the line 5—5 of FIGURE 4.

FIGURE 6 is an enlarged fragmentary side elevational view partially in section of the trailer in the region of the rear wheels and the undercarriage thereof.

FIGURE 7 is a sectional elevational view partially broken away located substantially along the line 7—7 of FIGURE 6.

FIGURE 8 is a sectional view taken substantially along line 8—8 of FIGURE 5.

FIGURE 9 is a fragmentary elevational view partially in section similar to a portion of FIGURE 7 but showing a second embodiment of the invention.

In highway transport apparatus such as the trailer truck 10 shown in the accompanying drawings it is customary to employ a trailer 11 whose length is adjustable with the trailer being drawn by a truck tractor indicated at 12. The conventional trailer utilizes a bed portion 13 in combination with a slidable undercarriage 14 that employs a frame 15. This undercarriage carries the usual four wheels 16 with the customary air suspension means 17, axle 18, air brake cylinders 19 and shock absorbers 20. The trailer 11 also carries on its forward end a normally retracted support 21 that is used to hold the forward end of the trailer when the tractor 12 is detached.

The frame 15 of the undercarriage 14 is provided with parallel flat coplanar ways 22 on opposite sides thereof adapted to slidingly support similar ways 23 which are attached to the bed 13. Sliding the bed 13 relative to the frame 15 permits the operator to shift the weight of the rear axle of the trailer when required to comply with the different laws of different states.

In order to hold the ways 22 and 23 in engagement and prevent lateral shifting there are provided a series of side keepers 24 bolted to the sides of the frame 15 and having inturned upper ends 25 adapted to engage the top of the bed ways 23 to retain them in engagement with the ways 22.

In order to hold the trailer to its adjusted length there is provided attaching means in the conventional tractor trailer structure including a retractable pin 26 (FIGURE 8) on the front of the undercarriage frame 15 that is normally held in one of a series of aligned openings 27, 28, 29, 30 and 31 that are located in a longitudinally extending bar 32 which forms a part of the bed 13. This retractable pin 26 is operated by means of a lever 60 that extends under the bed 13 to be accessible from one side of the trailer with this lever bar being fulcrumed at one end 33 to the frame 15 and passes through a slot 34 in the pin to move the pin out of engagement with its opening when the bar is forced downwardly and move it into engagement when the bar is forced upwardly. In the embodiment shown the pin 26 is in the forwardmost opening 31.

With this conventional construction of a truck trailer the pin 26 locks the frame 15 of the undercarriage to the bed 13. When it is desired to change the weight of the rear axle of the trailer the pin 26 is retracted from its opening 27–31, the brakes of the rear wheels 16 are locked and the truck tractor 12 is used to pull the bed 13 forwardly of the frame 15 of undercarriage 14. This relative movement is provided by the sliding contact of the ways 22 and 23. When the desired new length is achieved the pin 26 is then forced into the respective opening to lock the bed and frame together.

When this type of conventional trailer is used to carry a front container 35 and a rear container 36, as shown in FIGURE 1, the two containers have adjacent ends 37 and 38. When the containers are of the storage type disclosed in the above-mentioned copending application access to these containers is customarily through one end, such as the end 37 of the rear container 36. If the rear container is to be serviced enroute, it is therefore necessary that the containers be drawn apart so that the end 37 is accessible.

The apparatus of this invention provides means for locking the rear container to the frame 15 when desired, so that when the bed 13 is drawn forwardly with respect to the frame 15 only the front container 35 will move with it with the rear container 36 being releasably attached to and stationary with the frame 15.

In the embodiment of FIGURES 1–8 this releasable attaching means employs a retractable second pin 39 mounted on the rear end of the frame 15 opposite to the location of the first pin 26 with this second pin adapted to engage an opening 40 in a channel member 41 that is attached to the bottom 42 of the rear container 36.

This pin 39 is adapted to be moved vertically within a sleeve 43 that is attached to a mounting bracket 44 on the frame 15. The lower end of the pin 39 is movably mounted in a lower bracket 45 also on the frame 15.

The sleeve 43 and contained pin 39 extend upwardly through a longitudinal slot 46 in the bed 13. This slot is to permit the above-described relative adjustment of the length of the trailer 11.

Surrounding the lower end of the pin 39 above the lower bracket 45 is a sleeve 47 provided with a handle 48. The sleeve 47 is attached to the pin 39 by a key 49 so that the pin 39 rotates with the sleeve 47. The lower end of this sleeve 47 is provided with an inclined cam surface 50 that is adapted to cooperate with an oppositely inclined cam surface 51 on the top of the lower bracket 45. Surrounding the pin 39 between the top bracket 44 and the top of the sleeve 47 is a helical spring 52 which presses downwardly on the sleeve 47 to urge the pin 39 downwardly and to hold the cam surface 50 in engagement with the cam surface 51. The spring 52 also holds the cam surfaces securely together at their lock point 53, as shown in FIGURE 7.

If desired, the rear container 36 need not be locked to the undercarriage 14 until it is desired to pull the containers 35 and 36 apart in the manner previously described. When such is desired, however, the pin 39 is turned and raised at the same time by rotating the pin 39 by pressure applied on the handle 48 of the sleeve 47. This causes the engaging cam surfaces 50 and 51 to raise the pin 39 to engage its opening 40, as shown in FIGURE 7. When the cam surfaces reach the lock point 53 the pin 39 is, of course, locked in its raised position with the result that the rear container 36 is attached to the frame 15. Then, when the first pin 26 is released from its opening in the manner described and the brakes of the rear wheels 16 locked, the tractor 12 may pull the bed 13 forwardly, also as described, to separate the two containers, as shown in FIGURE 2.

A second embodiment of the invention is illustrated in FIGURE 9. Here the retractable second pin 54 is moved upwardly into engagement with its opening 40 by means of a single acting air cylinder 55 supplied by an air hose 56 to the air supply for the truck and trailer. The compressed air forces the pin 54 downwardly out of engagement with its opening 40 while a spring 58 forces the pin upwardly into engagement. If desired, the pin 54 may be left in engagement with the opening 40 except when it is desired to remove or otherwise manipulate the rear container 36.

The releasable securing means of this invention is important in permitting the separation of the containers when desired, as previously described. It is also important in that the attachment of the rear container to the bed is not permanent as would occur with bolting but is only a temporary attachment as the containers are transportable and are designed to be readily positioned on and removed from the trailer.

As mentioned earlier, one end of each container 35 and 36 may be opened to provide access. Thus, as shown in FIGURE 3, the rear container 36 has rear doors 59 provided with releasable securing means 57.

Having described my invention as related to the embodiments shown in the accompanying drawings, it is my intention that the invention be not limited by any of the details of description, unless otherwise specified, but rather be construed broadly within its spirit and scope as set out in the accompanying claims. The embodiments of the invention in which an exclusive property or privilege is claimed are defined as follows:

1. In a movable transport apparatus having a bed, an undercarriage frame movable with respect to said bed, and first means for releasably locking said bed and undercarriage frame together against relative movement, container manipulating apparatus comprising: a first container on said bed; a second container on said bed having an end adjacent an end of said first container; second means exteriorly of said bed for releasably locking said second container to said frame; means for applying a moving force to said bed, whereby when said frame and bed are locked together by said releasable locking means said transport apparatus and containers thereon are transportable as a unit, and when said frame and bed are released from their locking means for relative movement and said second container is locked to said frame by said second locking means, said containers are drawn apart by moving said bed by said force applying means relative to said frame; and means for locking said frame against movement during said moving of said bed relative to said frame.

2. The apparatus of claim 1 wherein said second locking means comprises a socket member on one of said frame and second container and a movable socket engaging member on the other of said frame and second container.

3. In a movable transport apparatus having a bed, an undercarriage frame movable with respect to said bed, and first means for releasably locking said bed and undercarriage frame together against relative movement, container manipulating apparatus comprising: a first container on said bed; a second container on said bed having an end adjacent an end of said first container; second means exteriorly of said bed for releasably locking said second container to said frame including a socket member on one of said frame and second container and a movable socket engaging member on the other of said frame and second container; means for moving said socket engaging member into and out of engagement with said socket member; means constantly urging said socket engaging member away from said socket member; means for applying a moving force to said bed, whereby when said frame and bed are locked together by said first releasable locking means said transport apparatus and containers thereon are transportable as a unit, and when said frame and bed are released from their locking means for relative movement and said second container is locked to said frame by said second locking means, said containers are drawn apart by moving said bed by said force applying means relative to said frame; and means for locking said frame against movement during said moving of said bed relative to said frame.

4. The apparatus of claim 3 wherein said means for moving said socket engaging member comprises a rotatable cam having a cam surface engaging a reaction surface.

5. The apparatus of claim 3 wherein said socket engaging member is longitudinally movable into and out of socket engaging position.

6. In a movable transport apparatus having a bed, an undercarriage frame movable with respect to said bed, and first means for releasably locking said bed and undercarriage frame together against relative movement, container manipulating apparatus comprising: a first container on said bed; a second container on said bed having an end adjacent an end of said first container; second means exteriorly of said bed for releasably locking said second container to said frame including a socket member on said container and a longitudinally movable socket engaging pin on said frame; means on said frame mounting said engaging member for said longitudinal movement; means for moving said socket engaging member into and out of engagement with said socket member; means constantly urging said socket engaging member away from said socket member; means for applying a moving force to said bed, whereby when said frame and bed are locked together by said first releasable locking means said transport apparatus and containers thereon are transportable as a unit, and when said frame and bed are released from their locking means for relative movement and said second container is locked to said frame by said second locking means, said containers are drawn apart by moving said bed by said force applying means relative to said frame; and means for locking said frame against movement during said moving of said bed relative to said frame.

7. The apparatus of claim 6 wherein said pin is rotatable and said means for moving said socket engaging member comprises a cam member on said pin and movable therewith having a cam surface engaging a fixed cam surface member.

8. The apparatus of claim 7 wherein said cam surface member is a part of said mounting means.

9. The apparatus of claim 6 wherein said means for moving include fluid pressure means.

10. The apparatus of claim 6 wherein said transport apparatus comprises a semitrailer normally having a truck coupled thereto with said frame having lockable wheels as a means for locking said frame against movement, and said truck is capable of applying a moving force to said bed.

References Cited by the Examiner
UNITED STATES PATENTS

| | | | |
|---|---|---|---|
| 2,847,137 | 8/1958 | Stringfellow | 214—515 |
| 3,151,880 | 10/1964 | Black | 280—408 |
| 3,152,837 | 10/1964 | Margala | 280—80 |
| 3,163,306 | 12/1964 | Bennett et al. | 280—415 X |

A. HARRY LEVY, *Primary Examiner.*

LEO FRIAGLIA, *Examiner.*